(12) United States Patent  
Soin et al.

(10) Patent No.: US 7,707,400 B2
(45) Date of Patent: Apr. 27, 2010

(54) DIRECT COMPUTING EXPERIENCE

(75) Inventors: Ravipal S. Soin, Sammamish, WA (US); Vikram Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/449,442

(22) Filed: Jun. 7, 2006

(65) Prior Publication Data

US 2007/0101392 A1 May 3, 2007

Related U.S. Application Data

(60) Provisional application No. 60/731,806, filed on Oct. 31, 2005.

(51) Int. Cl.
*G06F 15/177* (2006.01)
(52) U.S. Cl. .............................................. 713/2; 713/1
(58) Field of Classification Search ...................... 713/1, 713/2
See application file for complete search history.

(56) References Cited

U.S. PATENT DOCUMENTS

| | | | |
|---|---|---|---|
| 6,032,255 A | 2/2000 | Shim | |
| 6,763,458 B1 | 7/2004 | Watanabe et al. | |
| 6,816,944 B2 * | 11/2004 | Peng | 711/133 |
| 2003/0083761 A1 * | 5/2003 | Jacobs et al. | 700/94 |
| 2004/0202335 A1 * | 10/2004 | Lee et al. | 381/86 |

FOREIGN PATENT DOCUMENTS

| | | |
|---|---|---|
| KR | 10-2000-0001474 X | 1/2000 |
| KR | 1-2001-0073673 A | 8/2001 |

* cited by examiner

*Primary Examiner*—Tse Chen
(74) *Attorney, Agent, or Firm*—Workman Nydegger

(57) ABSTRACT

Described is a technology by which a computer system operates in a mode that is different from a general purpose operating mode, upon detection of a special actuation mechanism coupled to the computing device. For example, actuation of a special hardware button may boot or resume a sleeping computer system into a direct experience upon actuation, including by launching a special program corresponding to that button. The computer system may thus enter a mode in which it mimics a special purpose device such as a consumer electronics device, e.g., a dedicated media player. When in a direct experience, the computer system may also operate in a constrained/sandboxed mode in which operating system limits available functionality to less than what is available when running as a general purpose computer system, e.g., keyboard operation and/or file access may be limited. Different actuation mechanisms may correspond to different modes.

20 Claims, 6 Drawing Sheets

DIRECT COMPUTING EXPERIENCE

CROSS REFERENCE TO RELATED APPLICATION

The present invention claims priority to U.S. provisional patent application Ser. No. 60/731,806, filed Oct. 31, 2005, which is hereby incorporated by reference.

BACKGROUND

There is an industry push in some scenarios to make personal computers, especially notebook computers, act more like media playback consumer electronics devices. For example, consumers desire fast (e.g., no more than ten seconds) boot times, consumer electronics-like user interfaces and simple, task-focused user interfaces.

At the same time, part of the value of a notebook computer is that it provides entertainment functionality in the form of media playback. For example, a notebook computer can serve as a DVD player while traveling. However, a notebook is far more powerful than a conventional DVD player, and typically contains a fully-powered operating system, application programs and important data. To an extent, this conflicts with providing a consumer electronics-like user experience on a personal computer system.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards launching a computing device into a special computing experience (referred to as a direct experience) upon detection of a special actuation mechanism coupled to the computing device. For example, a dedicated button, a remote control device, and so forth may trigger a different operating mode, such as by launching a particular application program. The special actuation mechanism may instead (or additionally) cause the device to be operated in a constrained, or sandbox mode, in which only limited actions may be taken, e.g., as defined by a manufacturer or end user.

Multiple special actuation mechanisms may be present, and each may correspond to a different direct experience. For example, an actuator may launch one of a media player program, a personal information manager program; an email program, a calendar program, a media center-related program, or a browsing program. Some or all of the programs may be run in the constrained, or sandboxed mode.

Upon receiving a notification that a special actuation mechanism coupled to the computing device was actuated, the computer system may thus be operated in a direct experience that may resemble a dedicated device. Examples of such devices include a media player device, a personal information manager device, a device that displays time information, a calculator, a media center device, a personal video recorder, and an audio player. The direct experience may be exited and another experience entered, including operating the computer system as a general purpose computer system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
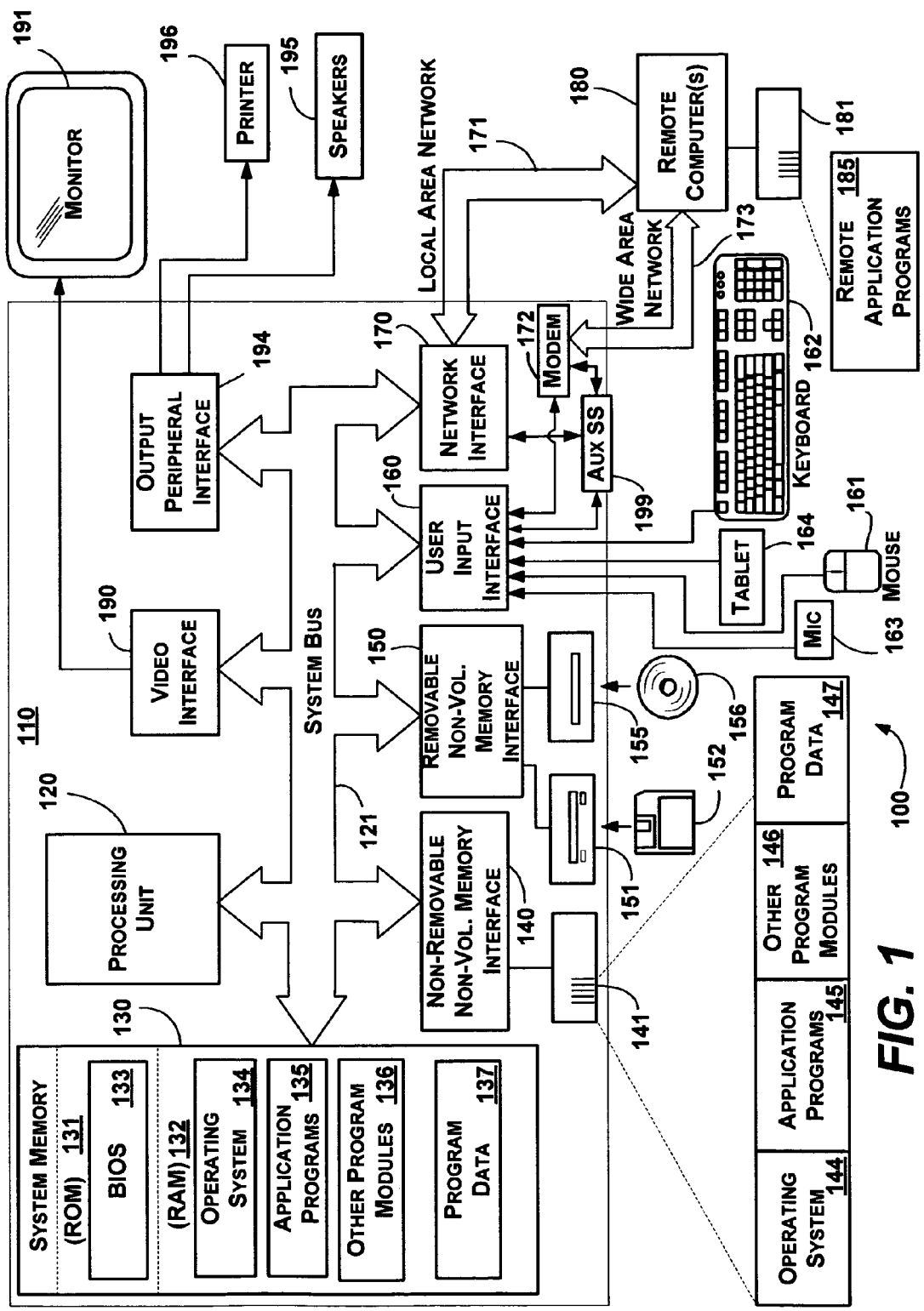
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Direct Computing Experience

Various aspects of the technology described herein are directed towards providing a mechanism by which a computer system such as a notebook computer system (e.g., which may be based upon the computer 110 of FIG. 1) may be entered into a mode that operates more like a consumer electronics device than a general purpose computer system. For example, in addition to being able to operate as a general purpose personal computer, via the technology described herein a computing device may operate as a full-screen, immersive simulation of special purpose devices such as a simple digital clock, a calculator, a portable DVD player, or a rich Media Center device. These special purpose devices are generally referred to as direct experiences, in that a user may directly enter an experience that is unlike the experience available with a general purpose computing device. In general, a computing device is wakened from any reduced power state (e.g., a "hard-off" state or a "soft-off" dormant state in a special way that directly enters a particular computing experience.

As will be understood, however, the various aspects described herein are not limited to any particular uses or examples. For example, one architecture exemplified herein is described with reference to a Windows®-based operating system and a direct experience platform that can launch from various power states corresponding to ACPI (Advanced Configuration and Power Interface, a computer industry standard for configuration and power management) sleep states. However other operating systems and power states may be used. As such, any of the examples, structures and/or functionalities described herein are non-limiting, and the present invention may be used various ways that provide benefits and advantages in computing and device usage in general.

For purposes of this description, ACPI standards for operating or being in a sleep state will be used as examples, with an "off" state referring to any sleep state other than the S0 working state (in which the CPU is executing code), including the hard-off state (e.g., S5) and soft-off states (e.g., S3, S4, and S0 state in unattended mode); the ACPI standard for such states is generally set forth in the table below:

| ACPI Power State | Meaning |
|---|---|
| S0 | Working state. The CPU is executing code. |
| S3 | Suspend state in which main memory is powered to maintain the user's session, but the CPU is not executing code. This is the power state Windows ® puts a personal computer into when the user selects Stand By in a User interface. |
| S4 | Suspend to disk. The main memory contents are persisted to a file after which the computer power may be turned off; the file contents are read back into main memory upon resume. This is the power state Windows ® puts a personal computer into when the user selects Hibernate in a User interface. |
| S5 | The personal computer is drawing no power and the user's session is gone. This is the power state Windows ® puts a personal computer into when the user selects Shut Down. |

The concept of a direct computing experience enables a computer user to very rapidly start utilizing a personal computer for media consumption or other device operation, including after the personal computer boots up or resumes from standby or hibernation. In a direct experience, the personal computer may, for example, act more like a dedicated media player or other consumer electronics device, e.g., as a portable DVD player. To this end, a direct experience infrastructure ordinarily utilizes a Human Interface Device (HID) event to start the personal computer from any dormant mode, including shutdown (S5), hibernation (S4) or standby (S3), and may immediately launch an application such as a program to play a DVD. Depending on the setup and user preferences/settings, the user may or may not have to log in.

In one example architecture, direct experience platform hardware includes one or more special-purpose actuators and associated system wake circuitry. In general, firmware (BIOS) support may be provided to enable the actuators and to preserve the system wake source (that is, which actuator was pressed). This may include both ACPI and non-ACPI firmware support.

Operating system components may include kernel mode components, such as an ACPI driver or the like which may be extended to support enumerating actuator capabilities and retrieving actuation events and system wake events from platform firmware, as well as for forwarding these to user mode software for consumption and further processing. In general, user mode components include a user mode software component to retrieve the system wake source from the kernel direct experience actuator driver, and launch a desired application program, along with (possibly) a facility for end user configuration to match available direct experience actuators to target applications, and a configuration data store.

Figure 2:
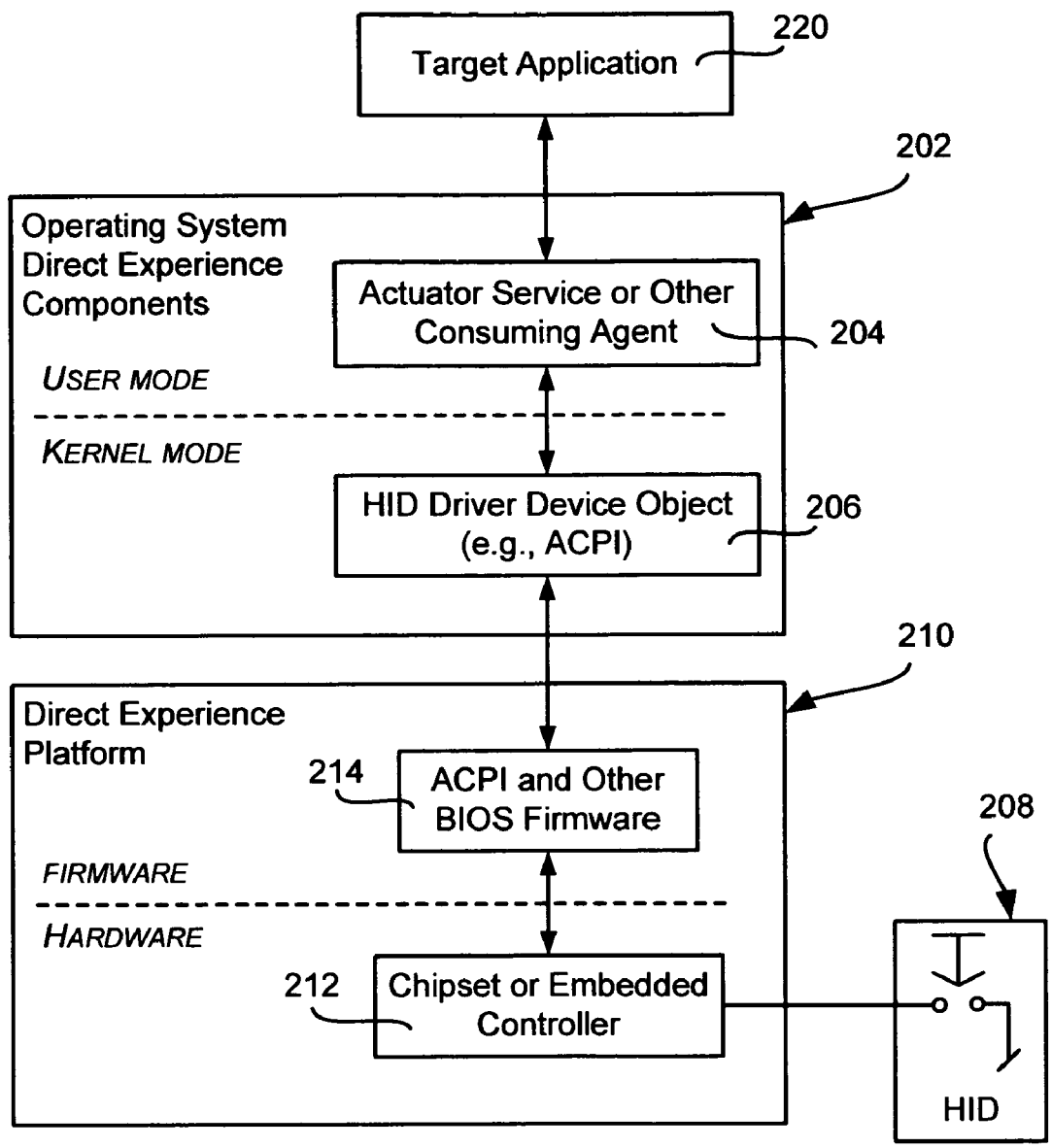
FIG. 2 is a representation of an architecture including components by which a target application program is launched to enter a computer system into a specialized experience based upon detection of a special actuation mechanism being actuated.

FIG. 2 is an example representation of such a general direct experience architecture/infrastructure, in which direct experience operating system components 202 may be provided for building hardware event-initiated, appliance-like experiences. In this particular example implementation, such components include an actuator handler service or other consuming agent 204, and a human interface device (HID) driver device object 206 (e.g., based on ACPIHID). In general, the actuator handler service 204 is responsible for providing any configuration user interface to allow a target application to be chosen, interacting with the driver 206 to request the system wake source from kernel mode, launching the proper application based on the wake source, and implementing logic to determine which user account should support application launch after the signal from the HID (e.g., a button press signal).

In general and as described below, in this example implementation, a direct experience event (in part) relates to a special purpose actuation mechanism (e.g., button) 208 whose actuation event starts or wakes a personal computer, with the same event or a corresponding event routed through a direct experience platform 210. Note that while FIG. 2 shows only a single actuation mechanism 208 such as in the form of a human interface device button/switch/remote control, as described herein, the direct experience platform may be designed to support one or multiple actuation mechanisms or the like on the system. Moreover, the actuation mechanism may be a process or the like, e.g., started from a timer or other wake-up means (e.g., network activity detector, phone detector, and so forth).

In general, the actuation mechanism 208 sends a signal to the computer system's chipset or an embedded controller 212. As such, the direct experience platform 210 is typically provided by a hardware manufacturer (OEM), but may be instead provided by a third party vendor or even an operating system vendor, such as in an add-on device. In response to the signal detection at the chipset/controller 212, ACPI and/or other BIOS firmware 214 provides data corresponding to the source of the wake event to the operating system kernel, e.g., to invoke the human interface device driver device object 206.

As described above, typically the actuation results in the actuator handler service or other consuming agent 204 launching a target application program 220, such as a media player. Note that depending on implementation details, if a machine is in the process of shutting down and the user hits a direct experience actuator, the system might still shutdown. If actuation of the HID occurs at the login screen or at any other time, the user may need to login (if required) and then enter the direct experience mode. If actuation occurs multiple times, the application may be launched once or multiple times; each application (or user policy/preference data) may dictate how to handle multiple invocations of the application.

As represented in FIG. 2, the direct experience components 204, 206 and 214 thus may leverage existing ACPI and Windows® Driver Model frameworks for firmware/operating system interaction, and may build on ACPI where necessary (e.g., defining new private methods, device IDs, and so forth). The operating system direct experience components 204 and 206 are designed to integrate with user mode consumers of the direct experience wake or actuation events. In the event that a given operating system does not include a user mode component and/or support therefor, the interface to the direct experience kernel mode component 206 may be designed such that manufacturers or other interested third party vendors may provide their own user mode consumers of direct experience events.

One embodiment may be designed to use new hardware actuators specific to direct experience functionality, (e.g., non-standard ACPI buttons), in which the direct experience model does not attempt to overload the meaning of or otherwise employ existing ACPI buttons. Another embodiment may share standard ACPI-related buttons, (such as by double-actuation, press and hold and so forth), including the ACPI power button, sleep button, lid switch, or any other ACPI wake source (real time clock, wake on LAN, and so forth). As such, a direct experience (e.g., special-purpose) actuator does not necessarily mean that the actuator is a physically separate entity, or that it is necessarily triggered by human interaction.

Figure 3:
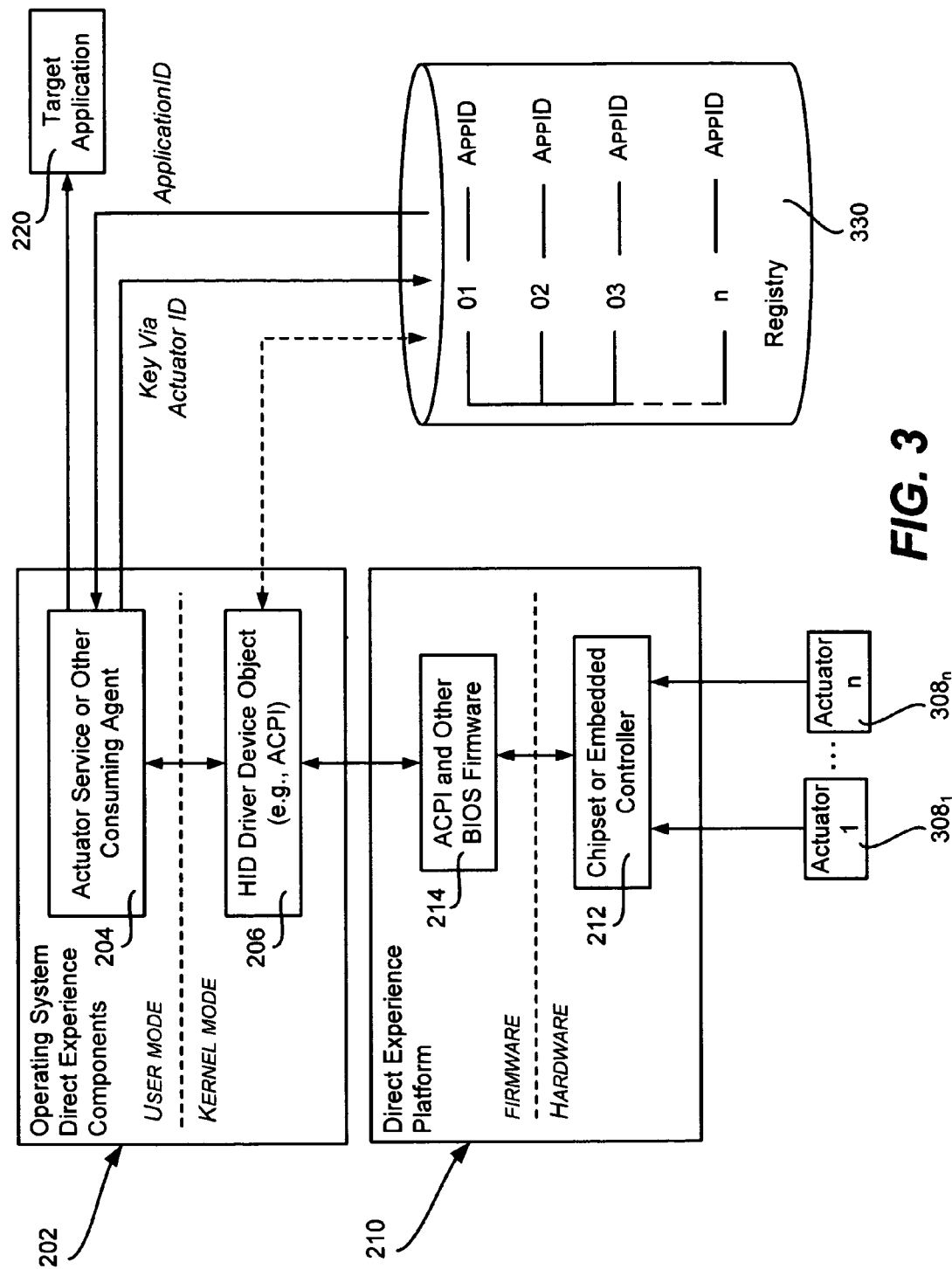
FIG. 3 is a representation of selecting a corresponding target application program when one of a plurality of special actuation mechanisms was actuated.

As described above, there may be multiple direct experience launch actuators, such as represented as actuators $308_1$-$308_n$ in FIG. 3. Note that multiple actuators pressed simultaneously or in some order may have further meanings, and also it is equivalent to have a single, dedicated direct experience button with multiple meanings depending on actuation patterns, as well as possibly other current state information, e.g., whether a media disk is in the media player. Thus, actuation patterns such as press-and-hold or (rapid) double-press may be distinguished to launch different application programs from the same actuator.

To differentiate among actions to take for a particular actuator $308_1$-$308_n$, (e.g., which special application to launch), the actuator service 204 can access a data store such as a system registry 330 to locate the action or actions to take. For example, the actuator service 204 can construct a registry key on the actuator ID, and map it to an application identifier via the registry 330, e.g., for determining and launching the target application 220. Note that instead of launching an application program, the data store (e.g., registry 330) may instead specify a different action to take, or specify one or more additional actions to take. The hardware manufacturer, vendor or the user may configure the action or actions to take.

In one example implementation, the kernel code 206 may load the registry 330 based on information provided by the BIOS at startup time, as indicated in FIG. 3 via the dashed arrow between the kernel code 206 and the registry 330. For example, the direct experience infrastructure may leverage the HID specification to allow the infrastructure to provide descriptors for defining each direct experience actuator's purpose, (e.g., a media play button, an email button, and so forth); the ACPI driver may retrieve these HID descriptors and store them in a known place in the registry 330, making them available to user mode components. Alternatively, the actuator descriptions may be previously stored in the registry 330 (e.g., by the equipment manufacturer) and may be accessed by the actuator service or other consuming agent 204 at runtime to determine the application identifier corresponding to the triggered actuator. In general, the exemplified direct experience infrastructure need not make any assumptions or force any limitations on what the actuator's target application function is; any direct experience actuator may be specified by the manufacturer or the like and/or be end user-configurable to launch any desired application or perform another action. Note that this includes taking no action, other than that the system wakes in response to the actuator event and otherwise takes no action after the operating system resumes operation.

For more desirable operation, the direct experience infrastructure supports actuators that implement waking from any sleep state, as well as system powering on from the S5 state. The actuators and infrastructure may also work as run time events from S0. For example, a media actuator may be responsible for starting the system from soft off (ACPI S5), waking the system from a sleep state (ACPI S1-S4), and/or providing notification of run time user actuator press events (from the ACPI S0 state). The manufacturer may determine whether the actuator transitions from the off state or the sleep state for a specific implementation.

As described herein, such a media actuator may be wired to any available GPE (general purpose event) on an ACPI-compatible chipset, or alternatively to a laptop's embedded (e.g., GPIO) controller that can be programmed to assert the embedded controller's GPE. The media actuator may be wired and the GPE programmed to function only as a wake event, and not as a run-time-only event. The direct experience infrastructure may leverage the sleep resume event logging and tracing work done for other generic platform wake events by the operating system. Thus, depending on how a system is configured, a direct experience may be started via a direct experience actuator being actuated when the system is in the S1-S4 sleeping states, or when a direct experience actuator is pressed at run-time (e.g., when the system is in the S0 working state). The actions taken may be different depending on the state the computer system is in when the direct experience actuator is pressed.

An application may be launched immediately upon detecting actuation of a direct experience actuator. One way to expedite launching from S3 is to anticipate special resumes to provide a better resuming experience, either automatically or by maintaining historical data. For example, when a user goes into a standby sleep state, the special purpose program (or programs) may be automatically placed in memory in anticipation of the resume from standby event being a direct experience event, so that that the application is already in memory upon resume, should the user resume via the appropriate actuator. Similarly, when the system hibernates, the special purpose program (or programs) may be automatically placed in memory in anticipation of the resume from hibernation being a direct experience resume, e.g., before memory contents are transferred to disk in a hibernation file. Alternatively, the hibernation file may be automatically loaded upon resume, including direct experience resume, with a corresponding direct experience-triggered program automatically loaded and executed.

Note that one action may be to require a login for a particular actuator, and launch an application following a successful login (or possibly launch a different application following an unsuccessful login).

When running a system with a direct experience, the system may be operated in a constrained/sandboxed mode, in which only certain operations can occur, e.g., the keyboard may be effectively locked (except for possibly a pattern that allows exiting the sandboxed mode), the file system cannot be accessed (except for possibly specially designated media content) and so forth. This may be dependent on which actuator was pressed, and also may be dependent on whether log-in was required. For example, the computer system may operate as a media player only, with no or limited keyboard operation and file access, if a user resumes (including possibly via an existing ACPI button rather than a separate direct experience actuator) but does not provide the correct password for full general purpose operation. In other words, a computer system may be configured such that failing to properly log in is considered to be one type of direct experience actuation.

Other non-media examples of starting the operating system via one or more properly configured special purpose actuators include starting a game program, starting a personal information manager program, starting a device, and so forth. Moreover, the special purpose actuation may be started without an explicit or physically discernable actuator, such as, for example, by loading a certain DVD movie; opening the lid a certain amount, and so forth. Essentially any trigger mechanism distinguishable by the computer system may result in a direct experience being started.

In one implementation, the direct experience actuator press events may be exposed using existing kernel event notifications, such as from a kernel power manager using kernel event notification system notifications. The kernel event notification system notification for a direct experience actuator event may include various data, such as a timestamp of the actuator event (the time the ACPI driver received a Notify from platform ACPI source language, or ASL), the instance ID or other identifier of the direct experience actuator, and one or more flags containing additional information, such as configuration information, state information, or other information of potential interest to user mode components.

As can be readily appreciated, the example implementations described herein allow a computer system to be started from any off state, including standby (e.g., ACPI S3), hibernate (e.g., ACPI S4) and shutdown (e.g., ACPI S5), and launch an end user experience, typically an application, specific to the particular actuation mechanism used to start the system. For example, system designers may add consumer-friendly access buttons such as media-related buttons through chassis panels or wireless remote controls. These actuation mechanisms are dedicated to starting the system from an off state or waking the system from a sleeping state and then entering into a dedicated experience, such as a media playback mode. Normally, resuming from sleep returns the system to the state and context at which the operating system was suspended, and booting the system from the off state presents the login or user's desktop screen, depending on user account and password configurations. However, an alternative desired experience for systems designed to feature media playback may be to start or wake the computer through a special-purpose actuator and immediately (as soon as the system is running) present the user with a media player, dedicated media shell, or other application program.

In one general example, the platform's BIOS support comprises ACPI and non-ACPI firmware, with the system's BIOS firmware responsible for declaring the direct experience actuator object or objects in ACPI, providing the actuator's ACPI configuration and operational support, correctly enabling the special-purpose actuator, such as arming the actuator for wake from ACPI sleep states, or from the S5 state, and capturing and correctly identifying the system wake or startup actuator press. The BIOS may also preserve the wake source event across ACPI transitions (e.g., from the ACPI S4 or S5 states), provide standard ACPI device configuration, method, and event support for the actuator device, and provide a method for retrieving an actuator's intended function.

To enable the operating system to determine the source of transition to wake, hardware or firmware detects and saves the source of the wake event so that it can be returned later. Note that in one implementation, subsequent actuator events do not overwrite the original wakeup source. Further note that in this particular example implementation, the ACPI driver retrieves the HID description for each unique actuator device described in the ACPI namespace, and makes this available to the actuator service or other user mode components 204. The ACPI driver handles run time and wake notify events issued from the platform's ACPI namespace, and interfaces with the kernel power manager to issue a kernel event notification system notification of direct experience actuation events. Actuation or wake events may be conveyed from the platform firmware to the actuator driver using ACPI Notify codes. Note that the ACPI driver may notify interested consumers of direct experience events using kernel event notification system notification mechanisms.

System software components interested in listening to direct experience events may register for direct experience notifications using a kernel event notification system API or the like. For example, if the actuator service 204 (FIG. 2) recognizes an actuator type and is configured to take action on actuation events for that type, the actuator service 204 registers for notification of direct experience actuator events via the kernel event notification system.

Figure 4:
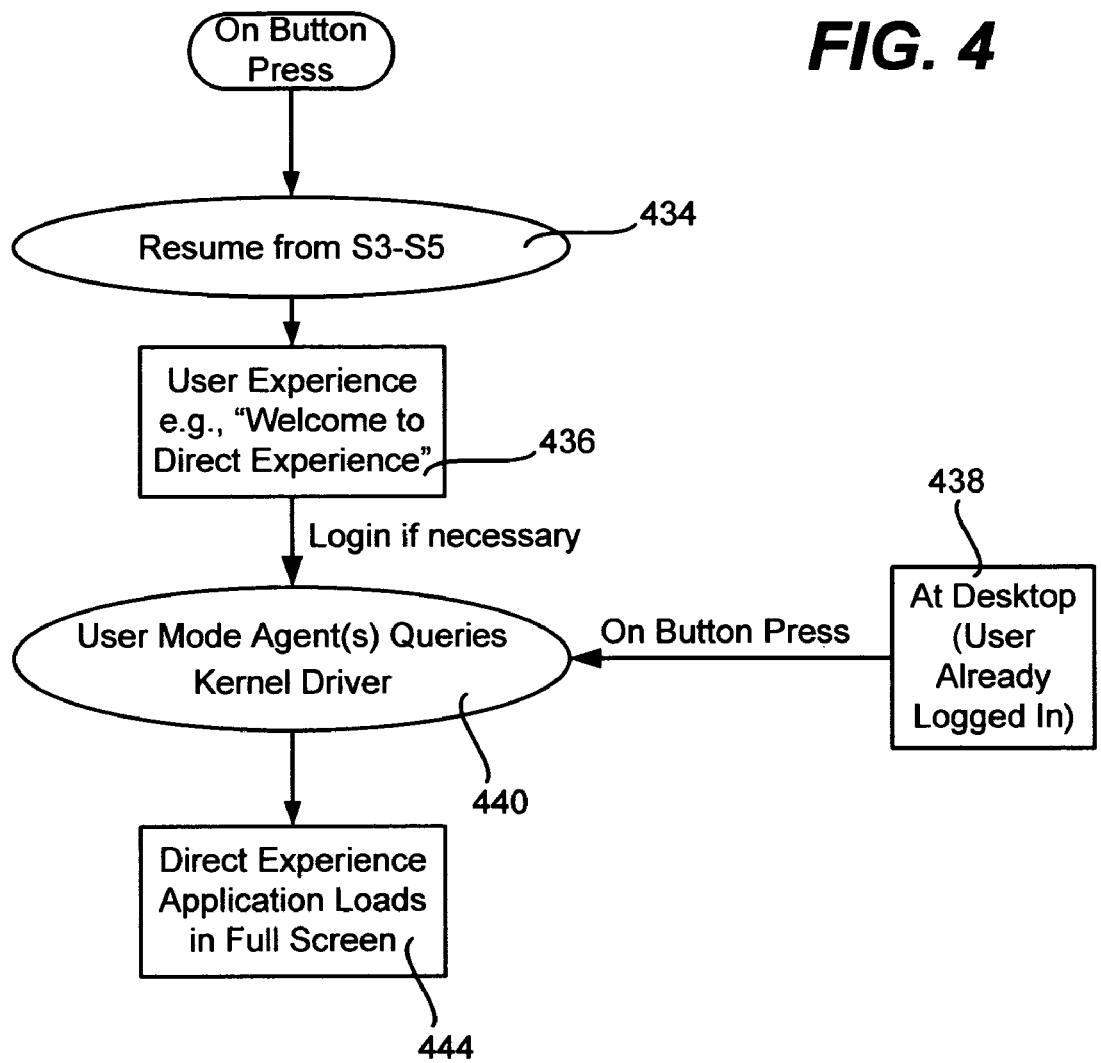
FIG. 4 is a representation of an agent operating in response to a special actuation mechanism being actuated.

In one embodiment, operating system security is maintained by ensuring that the need for a user's credentials is not bypassed or otherwise circumvented, thus preventing unauthorized access to the computer system. For example, FIG. 4 shows a button press that causes a resume from a sleep state (step 434), as well as a button press that may occur on the desktop with the use already logged in (step 438). As represented in FIG. 4, a user agent may run under a logged-in user (that wants to support direct experience) with that user's credentials. Whether waking from a sleep state (step 434) or when the desktop on which the agent is enabled gains focus (step 438), the agent detects when the desktop of the user account in which the agent is running becomes active. If the account becomes active, the agent communicates with the kernel driver at step 440 to determine the system wake or power-on source (e.g., which actuator was pressed), and launches the direct experience application (step 444) for that actuator and that user.

Figure 5:
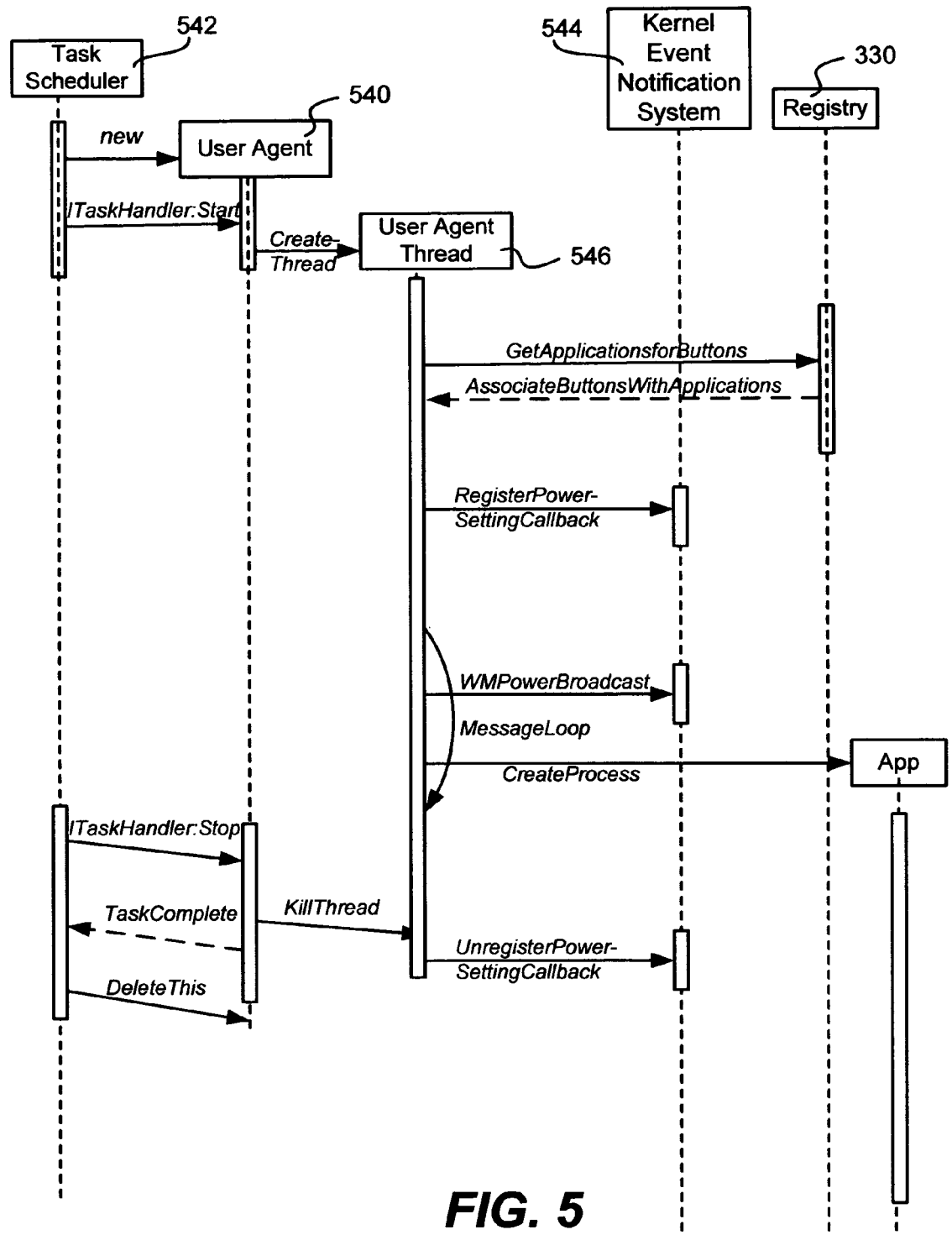
FIG. 5 is a representation of timing and operations when an agent is started by a task scheduler to enter a computer system into a specialized experience.

As represented in FIG. 5, an example direct experience user agent 540 may be started by a task scheduler 542 at the time of user login. The user agent 540 registers with the kernel event notification system 544 to be notified whenever any direct experience actuator is pushed. In one example design, the user agent 540 is implemented as an in-process COM component (loaded by the task scheduler) that supports the ITaskHandler interface (used by the task scheduler to communicate with loaded COM components). As represented in FIG. 5, the user agent 540 is started by the task scheduler 542 when the user logs in (the Login event). The task scheduler 542 calls the ITaskHandler::Start method. When the user agent 540 is started, it spawns a separate worker thread 546 and returns control to the task scheduler 542, such as required by the task scheduler 542.

The worker thread 546 may create a hidden window that is used to receive power setting change notifications from the kernel event notification system 544. After the window is created, the window retrieves the needed information from the registry 330 to provide a mapping between the actuated mechanism (e.g., button) and the application to launch. For example, a first registry location may be filled in at startup from the firmware by ACPI, to provide a map between the actuator identifier (e.g., ButtonId) and one or more other (e.g., UsageID) identifiers. A second location is filled in by manufacturers, to map the usage identifier to the application to launch. The user agent 540 reads both locations and creates a mapping between the actuator identifier and the application to launch.

Then, the user agent 540 may register itself with the kernel event notification system 544 to receive notifications for the direct experience actuators. If the operating system was started in response to the pressing of one of the direct experience actuators, the user agent 540 receives a notification as soon as it has registered, and enters into a message loop and waits for a notification event from the kernel event notification system 544.

When the user agent 540 receives a notification from the kernel event notification system 544, the user agent 540 may check for the existence of other system settings, such as group policy settings, that computer system administrators may specify to override locally-configured direct experience behavior. If non-existent, the user agent 540 may check the timestamp of the notification. If the timestamp in the message payload is newer than the timestamp value that is stored in the registry 330, the user agent determines which actuator was pressed and launches the application that is associated with that actuator. For example, the kernel event notification system 544 provides the actuator identifier in its message, which the user agent 540 then compares to the previously loaded actuator-to-application mapping to determine which application to launch. After the application is launched, the user agent 540 may stay active, waiting for further notifications from kernel event notification system 544. The user agent 540 stops when a particular stop method (e.g., the ITaskHandler::Stop method) on the user agent 540 is called (e.g., to destroy the window and terminate the thread), unless and until resumed by another method call.

Thus, in this example the user agent 540 is dependent upon the task scheduler 542 to launch it at startup, as well as on the kernel event notification system 544 to notify it when a direct experience actuator is detected, and possibly on group policy settings, (e.g., the user agent may not launch without appropriate settings). The user agent 540 is also dependent on the registry 330, which contains the data for the direct experience actuator(s) and the associated application(s) to launch in response to a direct experience event.

Figure 6:
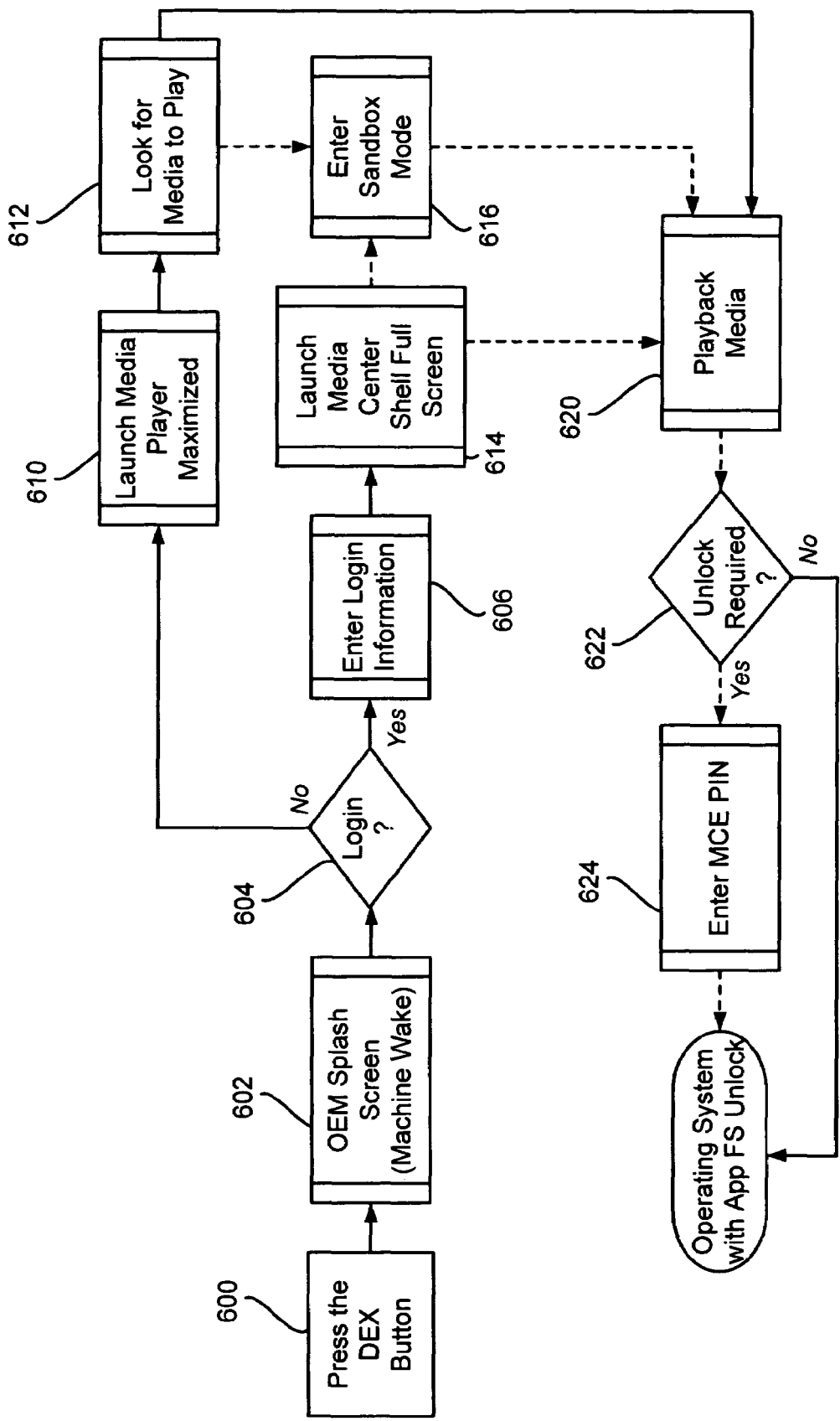
FIG. 6 is a representation of a workflow example for operating a computer system in a direct media experience.

FIG. 6 illustrates a direct media workflow example, including options when a direct experience actuator (DEX button) associated with a special media program wakes a machine (step 600). As can be seen, following an optional initial display (step 602), the user may be prompted to enter login information at step 606, e.g., if required as exemplified by step 604 such as by the system setup and user preferences/settings. Note that the login requirement may depend on which actuator was pressed, e.g., login for one actuator, but not for another.

In this example configuration, the user need not log in, and if the user does not, the actuator handler 204 automatically launches a media player application at step 610. The media player application looks for media to play at step 612, and (assuming the media is found) plays the media at step 620. Note that the system may launch the media player application as full screen, e.g., optimized for DVD/CD only. Further note that as indicated by the dashed line from step 612, the system may first enter a sandbox mode, as represented via step 616 and described above.

In the event the user does successfully log in, (or if the system otherwise is configured to bypass the login) the system is, in this example configuration, instead launched with a dedicated media environment (such as the Microsoft® Media Center shell) at step 614, e.g., in either full screen or maximized window mode, which may be customizable by the manufacturer or user. Again, depending on the configuration, the system may be operated in a constrained or sandbox mode, as represented via step 616 and described above.

Following media playback, the user may wish to exit the direct experience and operate the computer system as a general purpose computer. The user may be required to unlock the system (e.g., from the sandbox mode) at step 622, such as by entering a personal identification number at step 626, even if that user previously logged in with the proper credentials. For example, in the sandbox mode, the media center shell may be fully functional except for being unable to delete certain files.

Other example media-related options not shown in FIG. 6 include browsing and playing various content types from a media library (including licensed and unlicensed files, photos, play lists, and the like), and browsing and listening to music associated with the logged in user or shared by other users of the computer system or by other users on the computer system's network or internet.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method comprising:
    receiving a notification that a direct experience actuation mechanism coupled to the computer system was actuated; and
    in response to the notification, booting or resuming the computer system, and operating the computer system in a direct experience that is different from operating the computer system as a general purpose computer system, including launching at least one particular application program upon boot or resume that is not launched when the computer system is booted or resumed to operate as a general purpose computer system, and wherein operating the computer system in the direct experience comprises entering the computer system into a sandbox mode having less functionality than when the computer system is booted or resumed to operate as a general purpose computer system.

2. The method of claim 1 wherein launching the particular application program comprises accessing information in a data store to determine which application program to launch.

3. The method of claim 2 further comprising, obtaining the information that determines which application program to launch from firmware, and writing the information to the data store.

4. The method of claim 1 further comprising, exiting the direct experience and operating the computer system as a general purpose computer system.

5. The method of claim 1 further comprising, exiting the direct experience and entering the computer system into another experience.

6. The method of claim 1 wherein booting or resuming the computer system comprises booting or resuming from any off state, including a hard-off state or a soft-off state.

7. The method of claim 1 wherein the direct experience actuation mechanism comprises a hardware button.

8. The method of claim 1 wherein the at least one particular application program comprises one or more of: a media player program; a personal information manager program; an email program; a calendar program; a media center-related program; or a browsing program.

9. The method of claim 6 wherein the off states include a standby state, a hard-off state, and a hibernate state.

10. One or more computer storage media having stored thereon computer executable instructions which when executed by a processor in a computer system perform a method comprising:

receiving a notification that a direct experience actuation mechanism coupled to the computer system was actuated; and in response to the notification, booting or resuming the computer system, and operating the computer system in a direct experience that is different from operating the computer system as a general purpose computer system, including launching at least one particular application program upon boot or resume that is not launched when the computer system is booted or resumed to operate as a general purpose computer system, and wherein operating the computer system in the direct experience comprises entering the computer system into a sandbox mode having less functionality than when the computer system is booted or resumed to operate as a general purpose computer system.

11. The one or more computer storage media of claim 10 wherein launching the particular application program comprises accessing information in a data store to determine which application program to launch.

12. The one or more computer storage media of claim 10 further comprising, obtaining the information that determines which application program to launch from firmware, and writing the information to the data store.

13. The one or more computer storage media of claim 10 further comprising, exiting the direct experience and operating the computer system as a general purpose computer system.

14. The one or more computer storage media of claim 10 further comprising, exiting the direct experience and entering the computer system into another experience.

15. The one or more computer storage media of claim 10 wherein booting or resuming the computer system comprises booting or resuming from any off state, including a hard-off state or a soft-off state.

16. The one or more computer storage media of claim 10 wherein the direct experience actuation mechanism comprises a hardware button.

17. The one or more computer storage media of claim 10 wherein the at least one particular application program comprises one or more of: a media player program; a personal information manager program; an email program; a calendar program; a media center-related program; or a browsing program.

18. The one or more computer storage media of claim 15 wherein the off states include a standby state, a hard-off state, and a hibernate state.

19. A computer system comprising:

one or more processors; and one or more computer storage media having stored thereon computer executable instructions which when executed by the one or more processors perform operations comprising:

receiving a notification that a direct experience actuation mechanism coupled to the computer system was actuated; and in response to the notification, booting or resuming the computer system, and operating the computer system in a direct experience that is different from operating the computer system as a general purpose computer system, including launching at least one particular application program upon boot or resume that is not launched when the computer system is booted or resumed to operate as a general purpose computer system, and wherein operating the computer system in the direct experience comprises entering the computer system into a sandbox mode having less functionality than when the computer system is booted or resumed to operate as a general purpose computer system.

20. The computer system of claim 19 wherein launching the particular application program comprises accessing information in a data store to determine which application program to launch.

* * * * *